US008224258B2

(12) United States Patent
Jeon et al.

(10) Patent No.: US 8,224,258 B2
(45) Date of Patent: Jul. 17, 2012

(54) PORTABLE TERMINAL AND METHOD FOR CONTROLLING OUTPUT THEREOF

(75) Inventors: Byung-Su Jeon, Gyeonggi-Do (KR); Hyun-Bo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 12/556,498

(22) Filed: Sep. 9, 2009

(65) Prior Publication Data
US 2010/0093402 A1 Apr. 15, 2010

(30) Foreign Application Priority Data
Oct. 15, 2008 (KR) .................. 10-2008-0101328

(51) Int. Cl.
H04B 17/00 (2006.01)
(52) U.S. Cl. ................... 455/67.7; 455/575.1; 455/90.3; 345/173
(58) Field of Classification Search ................. 455/67.7, 455/575.1, 90.3, 418, 457, 158.4, 566, 177.1; 345/173, 174; 362/231
See application file for complete search history.

(56) References Cited

U.S. PATENT DOCUMENTS

| 7,510,300 | B2 * | 3/2009 | Iwauchi et al. | 362/231 |
|---|---|---|---|---|
| 8,019,390 | B2 * | 9/2011 | Sindhu | 455/566 |
| 8,035,621 | B2 * | 10/2011 | Joo et al. | 345/173 |
| 2006/0050018 | A1 * | 3/2006 | Hutzel et al. | 345/60 |
| 2007/0152977 | A1 | 7/2007 | Ng et al. | |
| 2008/0084401 | A1 * | 4/2008 | Joo et al. | 345/173 |
| 2009/0051660 | A1 * | 2/2009 | Feland et al. | 345/173 |
| 2009/0054107 | A1 * | 2/2009 | Feland et al. | 455/564 |
| 2009/0194341 | A1 * | 8/2009 | Nousiainen | 178/18.01 |
| 2009/0288889 | A1 * | 11/2009 | Carlvik et al. | 178/18.03 |
| 2009/0289914 | A1 * | 11/2009 | Cho | 345/173 |
| 2009/0303199 | A1 * | 12/2009 | Cho et al. | 345/173 |
| 2009/0305742 | A1 * | 12/2009 | Caballero et al. | 455/566 |
| 2010/0026656 | A1 * | 2/2010 | Hotelling et al. | 345/174 |
| 2010/0177060 | A1 * | 7/2010 | Han | 345/174 |
| 2010/0188328 | A1 * | 7/2010 | Dodge et al. | 345/156 |
| 2010/0211904 | A1 * | 8/2010 | Yun et al. | 715/773 |
| 2010/0323762 | A1 * | 12/2010 | Sindhu | 455/566 |
| 2011/0016390 | A1 * | 1/2011 | Oh et al. | 715/702 |
| 2011/0164058 | A1 * | 7/2011 | Lemay | 345/651 |
| 2011/0199335 | A1 * | 8/2011 | Li et al. | 345/175 |
| 2011/0234528 | A1 * | 9/2011 | Guedon et al. | 345/174 |
| 2011/0239166 | A1 * | 9/2011 | Choi | 715/863 |
| 2011/0310126 | A1 * | 12/2011 | Georgiev et al. | 345/660 |
| 2011/0310459 | A1 * | 12/2011 | Gates et al. | 359/296 |

FOREIGN PATENT DOCUMENTS

| GB | 2386707 | 9/2003 |
|---|---|---|
| WO | 02097597 | 12/2002 |
| WO | 2007103631 | 9/2007 |

* cited by examiner

*Primary Examiner* — Minh D Dao
(74) *Attorney, Agent, or Firm* — Lee, Hong, Degerman, Kang & Waimey

(57) ABSTRACT

A portable terminal includes a main body, a display, a plurality of sensors and a plurality of light elements. The main body includes a wireless communication unit. The display is coupled to the main body and is configured to output visible information. The plurality of sensors is coupled to the body and located at a peripheral region surrounding the display. A corresponding at least one sensor of the sensors is configured to receive user input for controlling a function associated with the visible information. The plurality of light elements is configured to output visible light. Each of the light elements is associated with one of the sensors to output the visible light proximate to the associated sensor. The corresponding at least one sensor is determined by which of the plurality of sensors is configured to permit controlling of the function associated with the visible information.

19 Claims, 14 Drawing Sheets

PORTABLE TERMINAL AND METHOD FOR CONTROLLING OUTPUT THEREOF

CROSS REFERENCE TO RELATED APPLICATIONS

Pursuant to 35 U.S.C. §119(a), this application claims the benefit of earlier filing date and right of priority to Korean Application No. 10-2008-0101328, filed on Oct. 15, 2008, the contents of which are hereby incorporated by reference herein in its entirety.

FIELD OF THE INVENTION

The present invention relates to a portable terminal configured to output light associated with an operation of a unit for inputting a command.

DISCUSSION OF RELATED ART

Terminals can be categorized as mobile/portable terminals or stationary terminals based on their mobility. The portable terminals may be categorized as handheld terminals or vehicle mount terminals based on whether they are configured to be directly carried by a user.

As many portable terminals are multifunctional, they can be used to capture still images or moving images, play music or video files, play games, receive broadcast, and the like, so as to be implemented as an integrated multimedia player.

In order to support and enhance such functions of the terminal, it may be necessary to improve the configuration and/or software of the terminal.

SUMMARY OF THE INVENTION

One embodiment includes a method for controlling a mobile terminal. The method includes outputting visible information on a display that is associated with the mobile terminal, and outputting visible light proximate to a corresponding first at least one sensor of a plurality of sensors. The plurality of sensors is coupled to the mobile terminal and is located at a peripheral region surrounding the display. The first at least one sensor is determined by which of the plurality of sensors is configured to permit controlling of a function associated with the visible information.

In one embodiment, a portable terminal includes a main body, a display, a plurality of sensors and a plurality of light elements. The main body includes a wireless communication unit. The display is coupled to the main body and is configured to output visible information. The plurality of sensors is coupled to the body and located at a peripheral region surrounding the display. A corresponding at least one sensor of the sensors is configured to receive user input for controlling a function associated with the visible information. The plurality of light elements is configured to output visible light. Each of the light elements is associated with one of the sensors to output the visible light proximate to the associated sensor. The corresponding at least one sensor is determined by which of the plurality of sensors is configured to permit controlling of the function associated with the visible information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE PREFERRED EMBODIMENTS

A description will now be given in detail of configurations of portable terminals according to the present invention, with reference to the accompanying drawings. Hereinafter, suffixes "module" and "unit or portion" for components used herein in the description are provided merely for facilitation of preparing this specification, and thus they are not granted a specific meaning or function. Hence, it should be noted that "module" and "unit or portion" can be used interchangeably.

A portable terminal described in the following description may be implemented using different types of terminals, such as mobile phones, smart phones, notebook computers, digital broadcast terminals, Personal Digital Assistants (PDA), Portable Multimedia Players (PMP), navigators, and the like.

Figure 1:
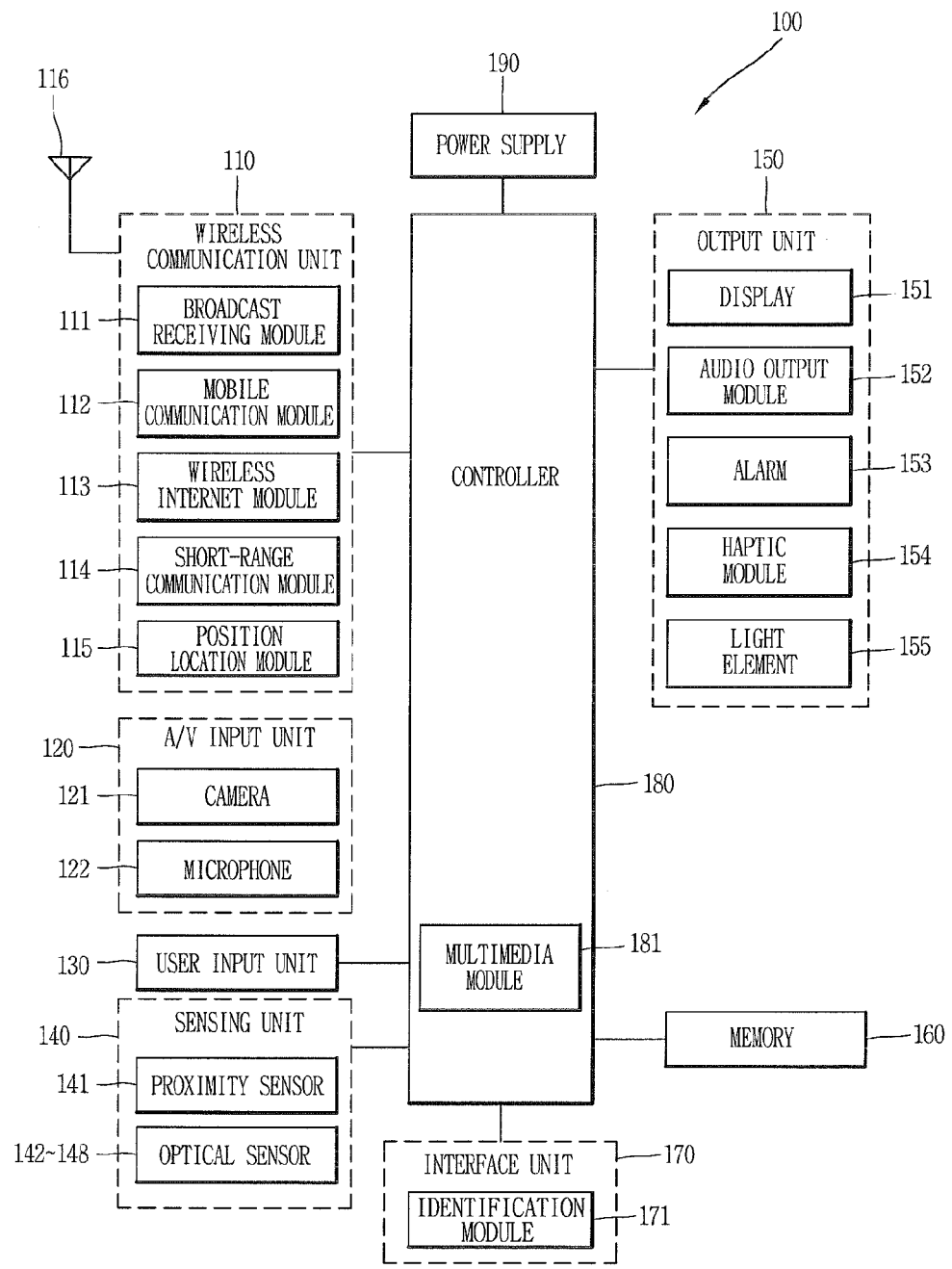
FIG. 1 is a block diagram of a portable terminal in accordance with an embodiment of the present invention.

FIG. 1 is a block diagram of a portable terminal 100 in accordance with one embodiment of the present invention. The portable terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190, and the like.

FIG. 1 depicts the portable terminal 100 having various components, but it is understood that implementing all of the illustrated components is not a requirement. More or fewer components may alternatively be implemented. Hereinafter, each component is described in sequence.

The wireless communication unit 110 may include one or more modules that permit wireless communications between the portable terminal 100 and a wireless communication system or between the portable terminal 100 and a network within which the portable terminal 100 is located. For example, the wireless communication unit 110 may include a broadcast receiving module 111, a mobile communication module 112, a wireless internet module 113, a short-range communication module 114, a position location module 115, and the like.

The broadcast receiving module 111 receives a broadcast signal and/or broadcast associated information from an external broadcast managing entity via a broadcast channel. The broadcast channel may include a satellite channel and/or a terrestrial channel. The broadcast managing entity may include a server that generates and transmits a broadcast signal and/or broadcast associated information or a server that receives a pre-generated broadcast signal and/or broadcast associated information and sends them to the portable terminal. The broadcast signal may be implemented as a TV broadcast signal, a radio broadcast signal, and/or a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For example, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as the memory 160.

The mobile communication module 112 transmits/receives wireless signals to/from at least one network entity, such as a base station, an external portable terminal, a server, etc., on a mobile communication network. The wireless signals may include an audio call signal, a video (telephony) call signal, or various formats of data according to transmission/reception of text/multimedia messages.

The wireless internet module 113 supports wireless Internet access for the portable terminal. This module may be internally or externally coupled to the portable terminal 100. Examples of such wireless Internet access may include Wireless LAN (WLAN), wireless fidelity (Wi-Fi®), Wireless Broadband (Wibro), Worldwide Interoperability for Microwave Access (Wimax), and the like.

The short-range communication module 114 denotes a module for short-range communications. Suitable technologies for implementing this module may include BLUETOOTH®, Radio Frequency IDentification (RFID), Infrared Data Association (IrDA), Ultra-WideBand (UWB), Zig-Bee®, and the like.

The position location module 115 denotes a module for detecting or calculating a position of a portable terminal. An example of the position location module 115 may include a Global Position System (GPS) module.

With continuing reference to FIG. 1, the A/V input unit 120 is configured to provide audio or video signal input to the portable terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the portable terminal.

The microphone 122 may receive an external audio signal while the portable terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the portable terminal. The user input unit 130 may include a keypad, a dome switch, a touchpad (e.g., static pressure/capacitance), a jog wheel, a jog switch, and the like.

The sensing unit 140 provides status measurements of various aspects of the portable terminal. For example, the sensing unit 140 may detect an open/close status of the portable terminal, a change in a location of the portable terminal 100, a presence or absence of user contact with the portable terminal 100, the location of the portable terminal 100, acceleration/deceleration of the portable terminal 100, and the like, so as to generate a sensing signal for controlling the operation of the portable terminal 100. For example, regarding a slide-type portable terminal, the sensing unit 140 may sense whether a sliding portion of the portable terminal is open or closed. Other examples include sensing functions, such as the sensing unit 140 sensing the presence or absence of power provided by the power supply 190, and the presence or absence of a coupling or other connection between the interface unit 170 and an external device. The sensing unit 140 may also include a proximity sensor 141 and a plurality of optical sensors 142 to 148. The optical sensors 142 to 148 may detect the change in light, such as changes in waveform or temperature after outputting the light, so as to determine whether a particular operation is executed.

The output unit 150 is configured to output an audio signal, a video signal or a tactile signal. The output unit 150 may include a display 151, an audio output module 152, an alarm 153, a haptic module 154, a radiating portion, such as a light element 155, and the like.

The display 151 may output information processed in the portable terminal 100. For example, when the portable terminal is operating in a phone call mode, the display 151 will provide a User Interface (UI) or a Graphic User Interface (GUI) that includes information associated with the call. As another example, if the portable terminal is in a video call mode or an image capturing mode, the display 151 may additionally or alternatively display images captured and/or received, UI, or GUI. The display 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 may be implemented as a transparent type or an optically transparent type through which the exterior is visible, which is referred to as 'transparent display.' A representative example of the transparent display may include a Transparent OLED (TOLED), and the like. The rear surface of the display 151 may also be implemented to be optically transparent. Under this configuration, a user can view an object positioned at a rear side of a terminal body through a region occupied by the display 151 of the terminal body.

The display 151 may be implemented as two or more displays according to certain aspects of the portable terminal 100. For example, a plurality of the displays 151 may be arranged on one surface spaced apart from or integrated with each other, or may be arranged on different surfaces.

If the display 151 and a touch sensitive sensor (referred to as a touch sensor) have a layered structure therebetween, the structure may be referred to as a touch screen. In this case, the display 151 may be used as both an input device and an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display 151 has been touched.

With continuing reference to FIG. 1, a proximity sensor 141 may be arranged at an inner region of the portable terminal 100 covered by the touch screen, or near the touch screen. The proximity sensor 141 detects the presence or absence of an object approaching a surface to be sensed, or an object disposed near a surface to be sensed by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and so on. When the touch screen is implemented as a capacitance type proximity sensor, proximity of a pointer to the touch screen is sensed by changes of an electromagnetic field. In this case, the touch screen may be categorized as a proximity sensor.

Hereinafter, for the sake of brief explanation, a status that the pointer is positioned to be proximate to the touch screen without contact will be referred to as 'proximity touch,' whereas a status that the pointer substantially comes in contact with the touch screen will be referred to as 'contact touch.' For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, and so on. The audio output module 152 may output audio signals relating to functions performed in the portable terminal 100, such as sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display 151 or the audio output unit 152, the display 151 and the audio output module 152 may be categorized into a part of the alarm 153.

The haptic module 154 generates various tactile effects that a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to skin being touched, air injection force or air suction force through an injection hole or a suction hole, touch by a skin surface, presence or absence of contact with an electrode, effects by stimulus such as an electrostatic force, reproduction of cold or heat using a heat absorbing device or a heat emitting device, and the like.

The haptic module 154 may be configured to transmit tactile effects or signals through a user's direct contact or a user's muscular sense using a finger or a hand. The haptic module 154 may be implemented using two or more of such modules according to the configuration of the portable terminal 100.

The light elements 155 are disposed in positions associated with optical sensors 142 to 148, to generate light for indicating that at least one of the optical sensors 142 to 148 is in an active state or an idle state. If the optical sensors 142 to 148 output visible light, such as through a light emitting element disposed within the optical sensor and associated with the optical sensor, the optical sensors 142 to 148 themselves serve as the light element 155. If the optical sensors 142 to 148 output non-visible light, the light element 155 may be a plurality of light-emitting elements, such as LEDs, respectively disposed adjacent to the optical sensors 142 to 148. In this case, such sensors disposed adjacent to the light elements 155 may be implemented as different types of sensors, not the optical sensors 142 to 148, including pressure sensor, magnetic sensor, touch sensor, and the like.

The memory 160 may store a program for the processing and control of the controller 180. Alternatively, the memory 160 may temporarily store input/output data (e.g., phonebook data, messages, still images, video, and the like). Also, the memory 160 may store data related to various patterns of vibrations and audio output upon the touch input on the touch screen.

The memory 160 may be implemented using any type of suitable storage medium including a flash memory type, a hard disk type, a memory card type (e.g., SD or DX memory), Random Access Memory (RAM), Static Random Access Memory (SRAM), Read-Only Memory (ROM), magnetic memory, magnetic disk, optical disk, and the like. Also, the portable terminal 100 may operate a web storage which performs the storage function of the memory 160 on the Internet.

The interface unit 170 may be implemented to interface the portable terminal with external devices. The interface unit 170 may allow data reception from an external device, power delivery to each component in the portable terminal 100, or data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module 171 may be configured as a chip for storing various information required to authenticate an authority to use the portable terminal 100, which may include a User Identity Module (UIM), a Subscriber Identity Module (SIM), and the like. Also, the device having the identification module 171 (hereinafter, referred to as 'identification device') may be implemented in a type of smart card. Hence, the identification device 171 may be coupled to the portable terminal 100 via a port.

The interface unit 170 may also serve as a path for power to be supplied from an external cradle to the portable terminal 100, when the portable terminal 100 is connected to the external cradle, or as a path for transferring various command signals input from the cradle by a user to the portable terminal 100. Such various command signals or power input from the cradle may operate as signals for recognizing that the portable terminal 100 has been properly mounted to the cradle.

The controller 180 controls the overall operations of the portable terminal 100. For example, the controller 180 performs the control and processing associated with telephony calls, data communications, video calls, and the like. The controller 180 may include a multimedia module 181 that provides multimedia playback. The multimedia module 181 may be configured as part of the controller 180 or as a separate component. The controller 180 may perform pattern recognition processing so as to recognize writing or drawing input on the touch screen as text or as an image.

The power supply 190 provides the power required by various components under the control of the controller 180. The provided power may be internal power, external power, or a combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), other electronic units designed to perform the functions described herein, or a selective combination thereof. In some cases, such embodiments are implemented by the controller 180.

For a software implementation, the embodiments, such as procedures and functions, may be implemented together with separate software modules, each of which performs at least one of functions and operations. The software codes may be implemented with a software application written in any suitable programming language. The software codes may also be stored in the memory 160 and executed by the controller 180.

Figure 2A:
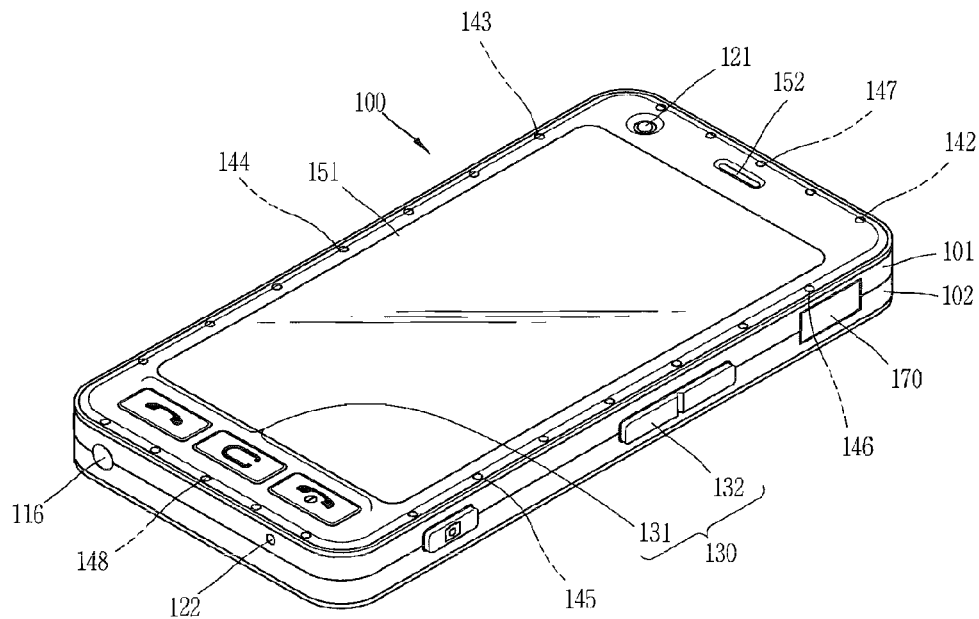
FIG. 2 is a front perspective view of the portable terminal in accordance with an embodiment of the present invention.

FIG. 2A, depicts a portable terminal implemented with a bar-type body, but other configurations are possible including a slide-type, a folder-type, a swing-type, a swivel-type, and the like, each having two or more bodies coupled to each other to be movable relative to each other.

The body includes a housing (case, casing, cover, or the like) that defines an external appearance. In this embodiment, the housing may be divided into a first or front case 101 and a second or rear case 102. A space formed between the front case 101 and the rear case 102 may accommodate various electronic components. At least one intermediate case may be further disposed between the front and the rear cases 101, 102. Such cases may be formed by methods such as injection molding using a synthetic resin, or be formed of a metal, such as stainless steel (CRES), titanium (Ti), or the like.

The front case 101 may be provided with a display 151, an audio output module 152, a camera 121, user input units 130, 131 and 132, a microphone 122, at least one optical sensor 142 to 148, an interface unit 170, and the like. The display 151 may occupy most of a main surface of the front case 101. The audio output module 152 and the camera 121 are disposed at a region adjacent to one of the end portions of the display 151, and the user input unit 131 and the microphone 122 are disposed at a region adjacent to another, opposite end portion thereof. The user input unit 132, the interface unit 170, and the like may be disposed at side surfaces of the front case 101 and the rear case 102.

The user input unit 130 may be manipulated to receive a command input for controlling the operation of the portable terminal 100, and include a plurality of manipulating units 131, 132. The manipulating units 131, 132 may be referred to as a manipulating portion. The manipulating portion may be manipulable by a user in any tactile manner.

Contents input via the user input units 131, 132 may be variously set. For example, the first manipulating unit 131 may be configured to input commands such as START, END, SCROLL, or the like, and the second manipulating unit 132 may be configured to input a command, such as adjusting an audio sound, converting the display 151 into a touch-sensitive mode, or the like.

The optical sensors 142 to 148 are adapted to receive a command input for controlling visible information output on the display 151. The optical sensors 142 to 148 may be disposed at a peripheral region other than a central region occupied by the display 151, such as at a region surrounding the display 151. The optical sensors may be configured without a limitation in number; however, the illustrated embodiment representatively employs $1^{st}$ to $7^{th}$ optical sensors 142 to 148.

Figure 2B:
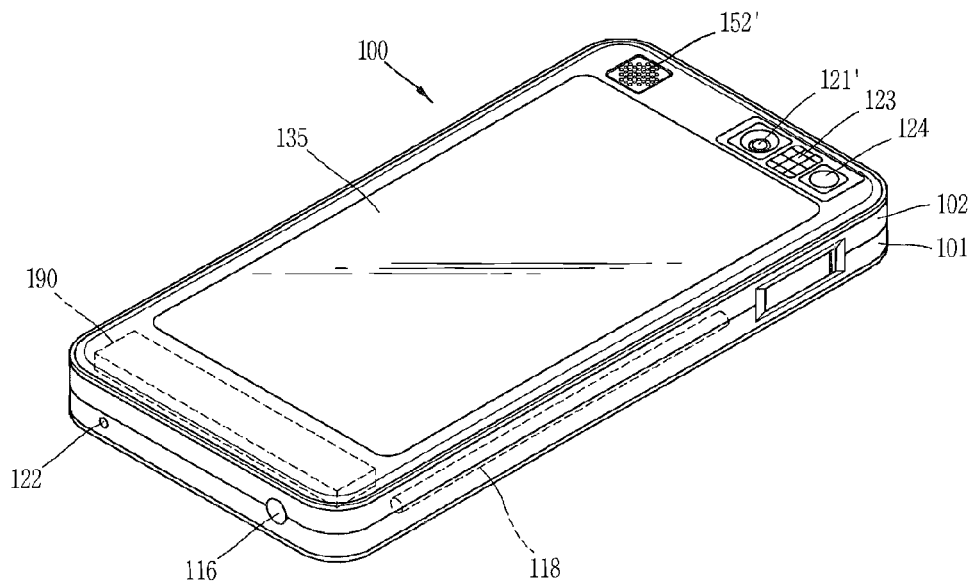

As shown in FIG. 2B, a rear surface of the terminal body, such as the rear case 102, may also be provided with a second camera 121'. The second camera 121' faces a direction that is opposite to a direction faced by the first camera 121, and may have a different pixel density from that of the first camera 121.

For example, the first camera 121 may operate with relatively lower pixel density (lower resolution). Thus, the first camera 121 may be useful for a user to capture an image of his face to send to another party during a video call or the like. On the other hand, the second camera 121' may operate with a relatively higher pixel density (higher resolution) such that it can be used by a user to obtain higher quality pictures for later use. The first and second cameras 121 and 121' may be installed in the terminal body so as to be rotatable or popped-up.

A flash 123 and a mirror 124 may also be disposed adjacent to the second camera 121'. The flash 123 operates in conjunction with the second camera 121' when taking a picture using the second camera 121'. The mirror 124 can cooperate with the second camera 121' to allow a user to photograph himself in a self-portrait mode.

A second audio output module 152' may also be disposed at a rear surface of the terminal body. The second audio output module 152' may cooperate with the first audio output module 152 to provide stereo output. Also, the second audio output module 152' may be configured to operate as a speakerphone.

A broadcast signal receiving antenna 118 may also be disposed at the side surface of the terminal body in addition to an antenna for communications. The antenna 118 configures a part of the broadcast receiving module 111 (see FIG. 1) and may be retractable into the terminal body.

A power supply 190 for supplying power to the portable terminal 100 may be mounted to the terminal body. The power supply 190 may be internally disposed at the terminal body, or may be detachably disposed outside the terminal body.

A touch pad 135 for detecting a touch input may also be disposed at the rear case 102. The touch pad 135 may also be configured to be light-transmissive, similar to the display 151. In this case, if the display 151 is configured to output visible information on both the front and rear surfaces, such visible information may be identified via the touch pad 135. Information output on both surfaces may be controlled by the touch pad 135. A display may further be mounted on the touch pad 135 so as to dispose a touch screen at the rear case 102.

The touch pad 135 operates in cooperation with the display 151 of the front case 101. The touch pad 135 may be disposed at the rear side of the display 151 in parallel with the display 151. Such touch pad 135 may be the same size as, or smaller than, the display 151.

Figure 3A:
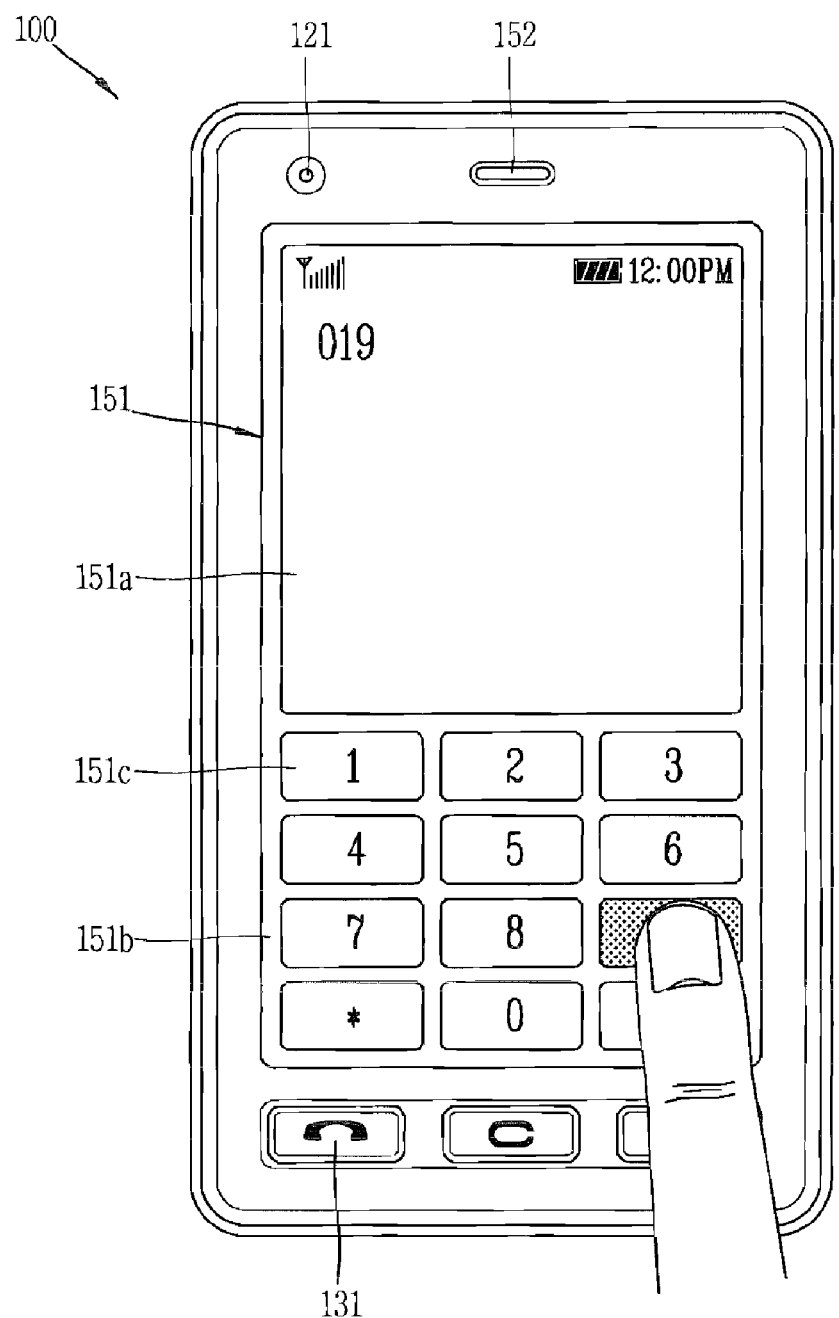
FIGS. 3A and 3B are front views showing one exemplary operational state of the portable terminal according to an embodiment of the present invention.
Figure 3B:
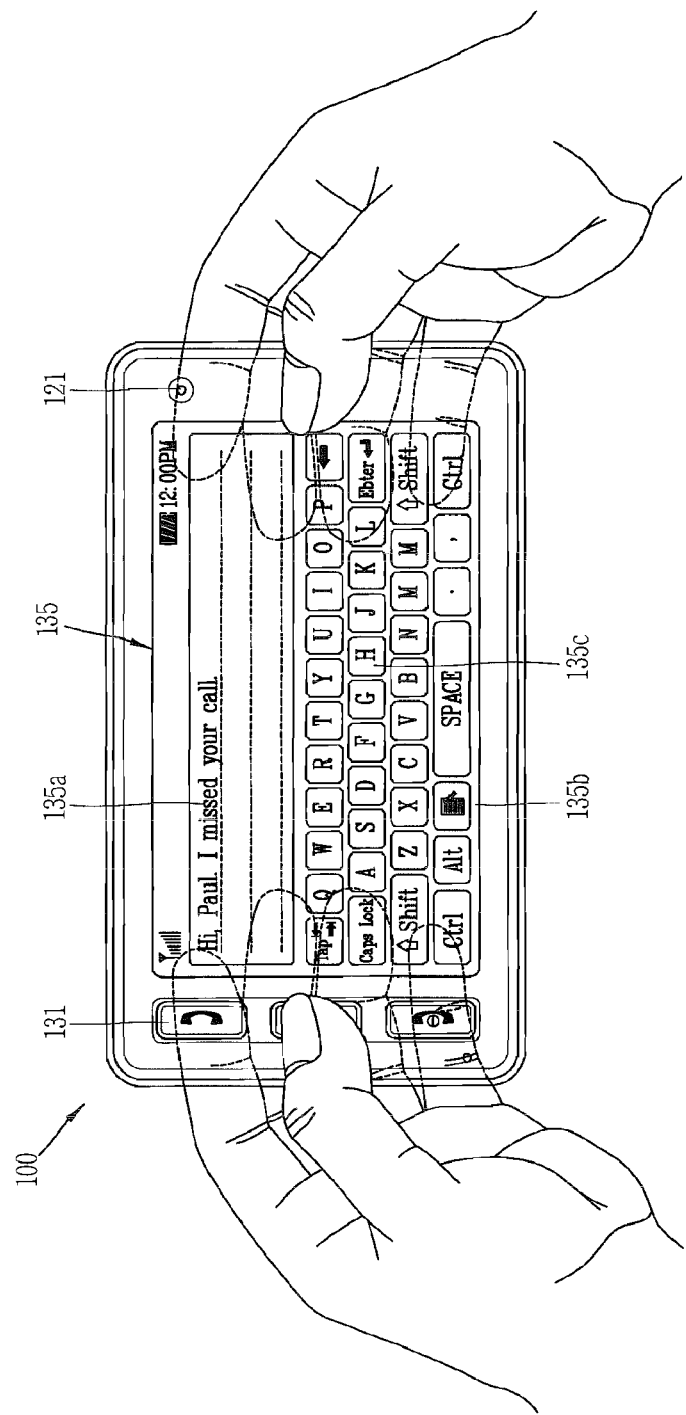

Referring to FIGS. 3A and 3B, the display 151 may display various types of visual information. Such visual information may be divided, according to their display forms, into letter (character), number, symbol, graphic, icon, or the like.

For the input of such information, at least one type of information among the letter, number, symbol, graphic or icon may be displayed in a preset arrangement, so as to be implemented as a type of keypad. Such keypad may be referred to as a 'soft key.'

The display 151 may operate as a single region or be divided into a plurality of regions. For the latter, the plurality of regions may be configured to cooperate with each other. For example, an output window 151a and an input window 151b are displayed on upper and lower portions of the display 151. Soft keys 151c with numbers represented thereon for inputting a phone number or the like are output on the input window 151b. Upon touching one of the soft keys 151c, a number or the like corresponding to the touched soft key 151c is displayed on the output window 151a. When operating the first manipulation unit 131, a call connection for the phone number displayed on the output window 151a is attempted.

FIG. 3B shows a touch input applied on a soft key from a rear surface of the terminal body. FIG. 3A shows that the terminal body is oriented vertically (i.e., portrait), while FIG. 3B shows the terminal body is oriented horizontally (i.e., landscape). The display 151 may be configured such that its output screen can be changed based on the orientation of the terminal body.

FIG. 3B shows that a text input mode is activated in the portable terminal. Output window 135a and input window 135b are displayed on the display 135. The input window 135b may be provided with a plurality of soft keys 135c, each having thereon at least one of a character, a symbol or a number. The soft keys 135c may be arranged in a QWERTY configuration.

When the soft keys 135c are touched via the touchpad 135, characters, numbers or symbols corresponding to the touched soft keys 135c are displayed on the output window 135a. As such, in comparison to the touch input via the display 151, the touch input via the touchpad 135 can prevent the soft key 135c from being obscured by a finger when being touched. When the display 151 and the touchpad 135 are transparently configured, fingers located at the rear surface of the terminal body can be visibly recognized, which allows for more accurate touch inputs.

In addition to the input methods described in the above embodiments, the display 151 or the touchpad 135 may be configured to receive a touch input in a scrolling manner. A user can scroll the display 151 of the touchpad 135 so as to move a cursor or pointer located on an object (subject, item, or the like), for example, an icon, displayed on the display 151. In addition, when moving a finger on the display 151 or the touchpad 135, a path tracing the finger can be visibly displayed on the display 151. This may be useful when editing an image displayed on the display 151.

In cooperation with a simultaneous touch of the display 151 (touch screen) and the touchpad 135 within a preset time period, one function of the terminal can be executed. An example of the simultaneous touch may include clamping the terminal body by a user using his thumb and index finger. The one function may be an activation or deactivation of the display 151 or the touchpad 135, for example.

With continuing reference to FIG. 2A, each of the at least one optical sensors 142 to 148 can receive a command by detecting at least one of the distance between the optical sensor and an object such as a user's finger, a stylus, or the like causing a change in light output by the optical sensor (hereinafter, briefly referred to as 'approach'), the period of time that the object approaches the optical sensor, the object ceasing to approach the optical sensor, the direction in which the approach of the object is released, the quantity of re-approaches of the object after the release of the approach, and a direction of movement of the object obtained by sequentially sensing the movement of the object by the plurality of optical sensors. In relation to the number of re-approaches, there may be a case where after the user moves his finger close to an optical sensor and then away from the optical sensor, the user may re-approach the optical sensor (hereinafter, referred to as 'double approach).

Figure 4A:
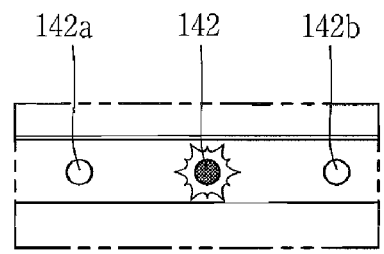
FIGS. 4A to 4C are overviews showing how optical sensors recognize the movement direction of an object.

As shown in FIG. 4A, when a first optical sensor 142 is activated to receive a command input by a user, its peripheral optical sensors 142a and 142b are deactivated. The activated state denotes an idle state.

Figure 4B:
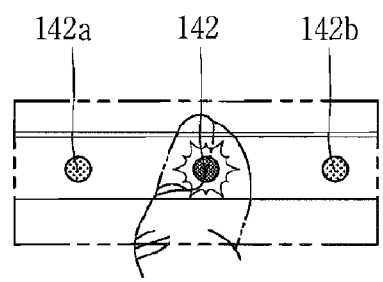

As shown in FIG. 4B, the user approaches the first optical sensor 142 to input a command into the first optical sensor 142. As the command for the first optical sensor 142 is input, the peripheral optical sensors 142a and 142b are activated to be in the idle state.

Figure 4C:
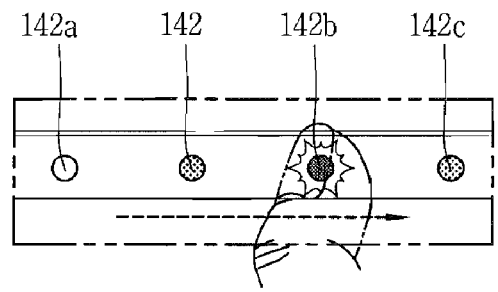

As shown in FIG. 4C, when the first optical sensor 142 is approached, if the object, such as the user's finger, stylus, or the like is moved in a direction of the arrow, the peripheral optical sensor 142b also receives a command input. Thus, the first optical sensor 142 and another peripheral optical sensor 142c are in the idle state.

As such, after a command is input for an optical sensor 142, if a command for a peripheral optical sensor 142b is input within a preset time period in a preset direction, such situation may be identified as a different case from a case where each of the optical sensors 142 and 142b receives a command after the preset time period. Such input may be referred to as an input by a 'dragging' operation.

Figure 5A:
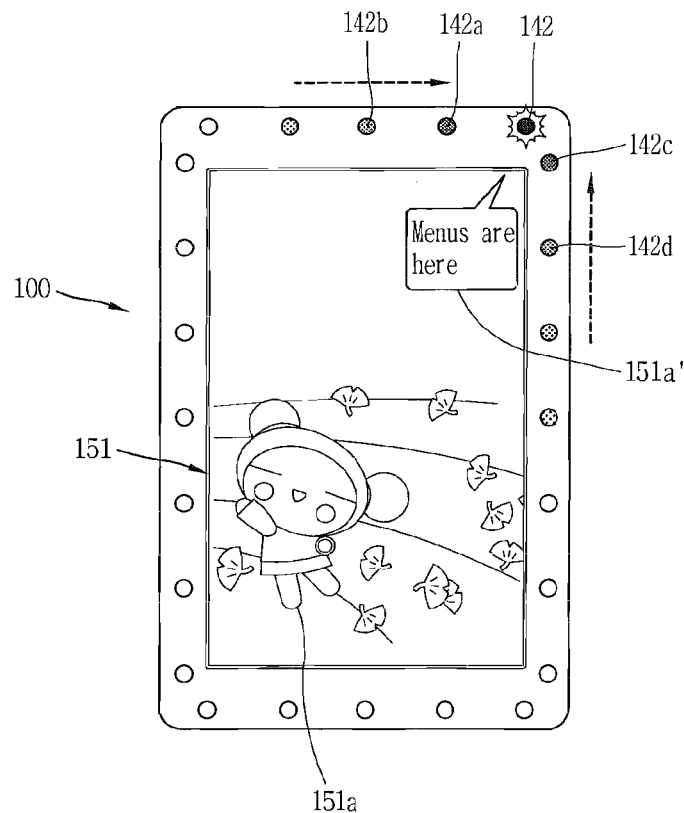
FIGS. 5A and 5B are overviews showing that an activated optical sensor is changed depending on the orientation of the portable terminal.
Figure 5B:
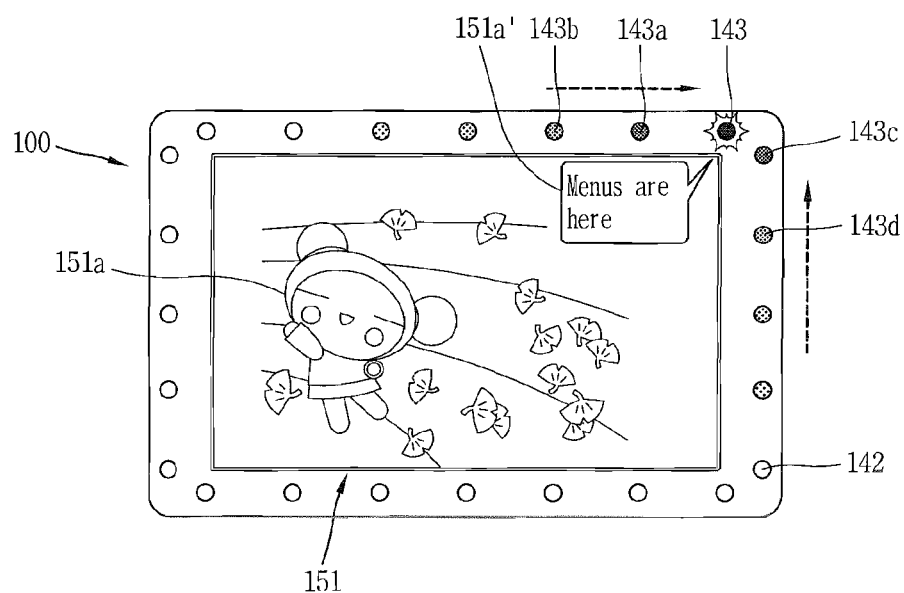
Figure 5C:
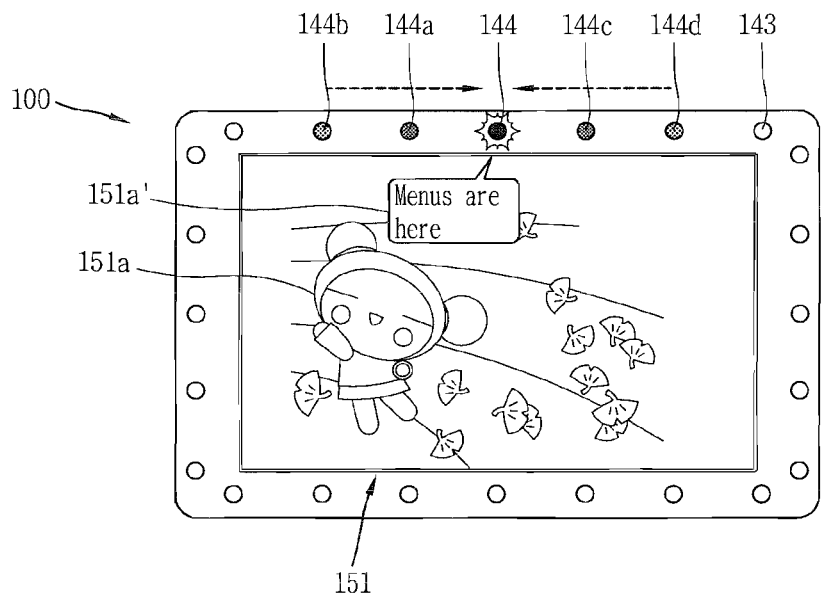
FIG. 5C is an overview showing that the activated optical sensors are changed.

FIGS. 5A and 5B are overviews showing that an activation of optical sensors depends on the orientation of the portable terminal 100, and FIG. 5C is an overview showing the change of an optical sensor being activated. For the sake of description, the portable terminal 100 is illustrated with a display 151 and optical sensors 142 to 148.

As shown in FIG. 5A, when the mobile terminal 100 is oriented for a portrait display mode, visible light is output from a position associated with the first optical sensor 142. The visible light denotes that the first optical sensor 142 is an optical sensor that is adapted or preset to receive a first command that relates to first visible information 151a that is to be output on the display 151.

One region of the display 151 adjacent to the first optical sensor 142 may display guide information 151a'. The guide information 151a' may indicate that when the first command is input via the first optical sensor 142, second visible information 151b (see FIG. 6A), such as menus, will be displayed. The contents of the guide information 151a' may be an expression, such as 'menus are here.'

When the first optical sensor 142 is approached, a menu for controlling the first visible information 151a may be output. Alternatively, since the display 151 is a touch screen, the menu may be output when a region on which the guide information 151a' is displayed is touched. If no approach or touch is input to the first optical sensor 142 or the touch screen within a preset time, the guide information 151a' may cease to be displayed. When the guide information 151a' ceases to be displayed, the visible light output from the position associated with the first optical sensor 142 may cease to be output. In this case, the first optical sensor 142 is also deactivated.

Such visible light may be output by the light element 155 (see FIG. 1) associated with the first optical sensor 142. Additionally, visible light for alarming may also be output near the first optical sensor 142. Such alarming visible light may serve to further attract a user's attention to the visible light associated with the first optical sensor 142.

The alarming visible light may be output by being radiated or flickered at a plurality of positions, such as positions 142a to 142d, peripheral to the first optical sensor 142 for a preset time. For the flickering, visible light may be intermittently sequentially or simultaneously flickered at the peripheral positions 142a to 142d to attract attention to the first optical sensor 142. Light emission from the peripheral positions 142a to 142d may be executed before or after the input for the first optical sensor 142 or upon the input for the first optical sensor 142. Visible light for alarming may also be output from sensors other than the sensors for receiving first and/or second commands before and/or after the input of the first or second command. Before the input, such light may serve to induce an input, and upon or after the input, such light may serve to confirm the input.

As shown in FIG. 5b, when the portable terminal 100 is rotated to be oriented for a landscape display mode, a second optical sensor 143, other than the first optical sensor 142, may be activated by association with the first visible information 151a. Accordingly, when an orientation of the display 151 is changed to the landscape direction, the user can use the second optical sensor 143 more conveniently than the first optical sensor 142.

When the second optical sensor 143 is activated, visible light may cease to be output from a position corresponding to the first optical sensor 142, and may be output from a position corresponding to the second optical sensor 143. In cooperation with the change in the optical sensor, the guide information 151a' is also displayed in a different portion of the display 151 from the previously displayed portion thereof.

As shown in FIG. 5C, the first command for controlling the first visible information 151a may be input by a third optical sensor 144 separate from the second optical sensor 143. The third optical sensor 144 is located at the central portion of the portable terminal 100.

When the user grasps the portable terminal 100, such as with his right hand, it may be inconvenient for the user to use the second optical sensor 143. In this case, if the user drags his finger to the third optical sensor 144 from the second optical sensor 143, the third optical sensor 144 is activated for the input of the first command. In this case, visible light associated with the third optical sensor 144 may be output, and visible light associated with the second optical sensor 143 may cease to be output. When the third optical sensor 144 is activated by the dragging operation, the alarming visible light may be output from a plurality of positions corresponding to peripheral optical sensors 144a to 144d in order to emphasize the activated third optical sensor 144.

As described above, a preset condition different from that in this embodiment, as well as the user's manipulation, can determine which optical sensors of the optical sensors 142 to 148 are activated for the first visible information 151a and whether visible light is output from the associated positions.

Figure 6A:
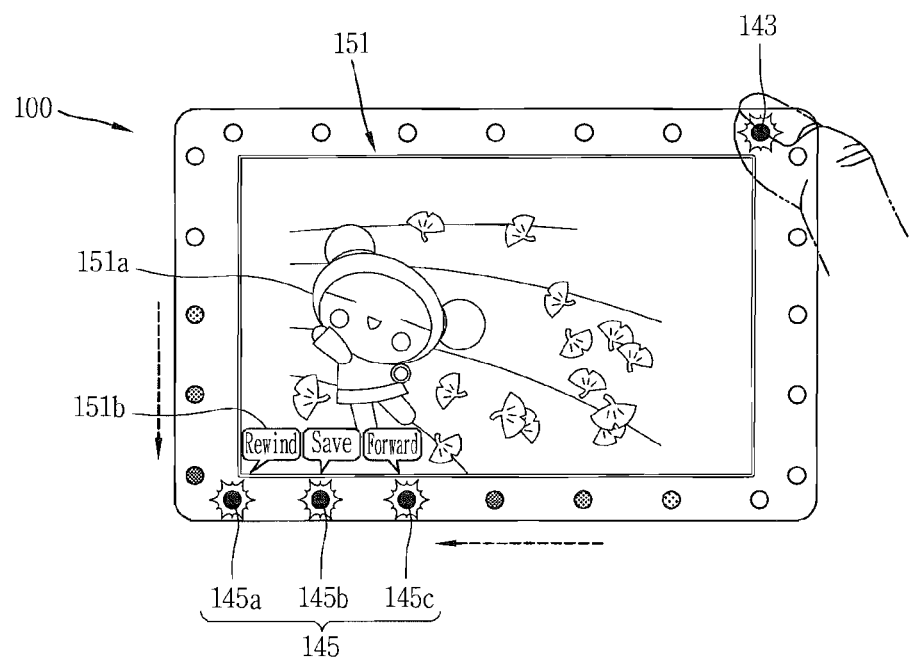
FIG. 6A is an overview showing that second visible information is displayed responsive to an input of a first command.
Figure 6B:
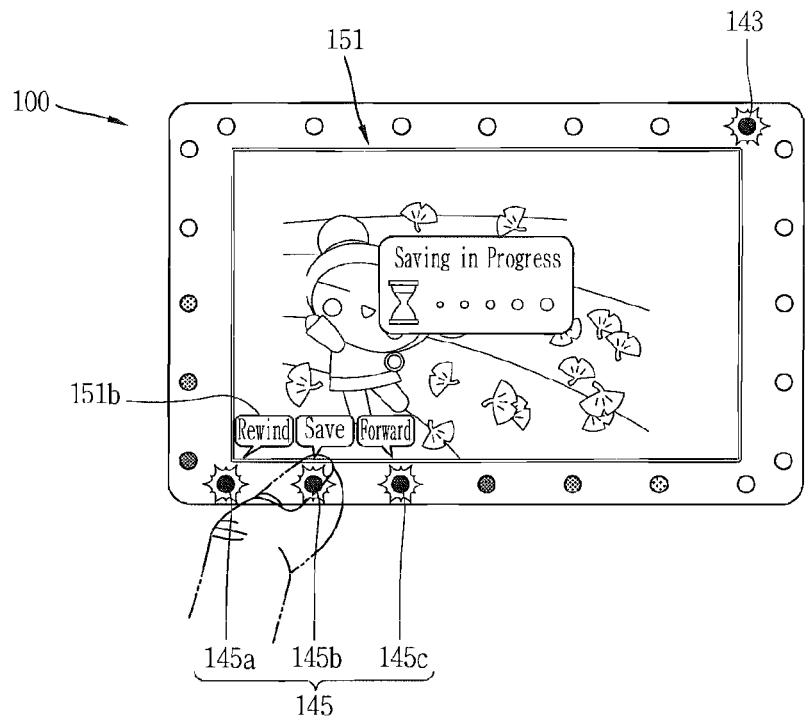
FIG. 6B is an overview showing that a command indicated in second visible information is executed.
Figure 6C:
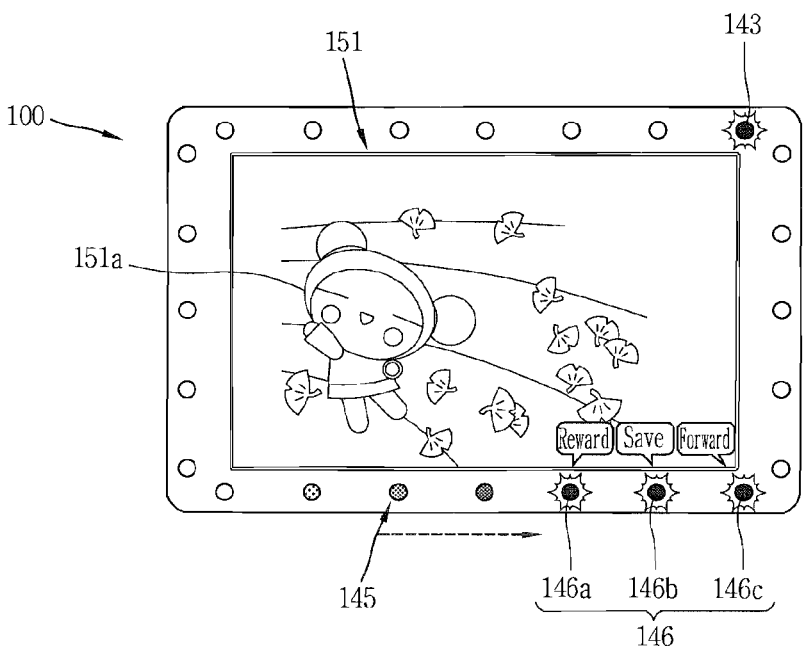
FIG. 6C is an overview showing a change of an optical sensor for receiving a second command associated with second visible information.

FIG. 6A is an overview depicting a second visible information displayed responsive to an input of a first command, FIG. 6B is an overview depicting a command indicated in the second visible information is executed, and FIG. 6C is an overview depicting a change of an optical sensor that is to receive a second command input for the second visible information.

As shown in FIG. 6A, when a first command is input by approaching the second optical sensor 143, second visible information 151b indicating menus for controlling the first visible information 151a is displayed on the display 151. A fourth optical sensor 145 is activated as an optical sensor, which can receive an input of a second command with respect to the second visible information 151b, such as a command for executing contents indicated in the second visible information 151b. The fourth optical sensor 145 may be provided as a plurality of optical sensors, such as three optical sensors 145a to 145c, according to the number of the second command. As such, for a plurality of second commands, the second commands may be input via an optical sensor (e.g., 145) other than the optical sensor 143, which received the first command. Alternatively, the second commands may be input via the optical sensor 143 that received the first command.

The second visible information 151b may be displayed on the display 151, for example, to at least partially overlap the first visible information 151a. The second visible information 151b may be information for guiding the second command, which causes the change in the first visible information 151a, such as generation, edition and disappearance (e.g., ceasing to display) of the first visible information 151a. For example, if the first visible information 151a is a movie content being reproduced, the second visible information 151b may indicate the second command, such as rewind, save, forward, and the like for controlling the movie content.

As shown in FIG. 6b, if a command 'save' is input as the second command by approaching the optical sensor 145b of the fourth optical sensor 145, a screen displayed on the display 151 may be stored in the memory 160 (see FIG. 1). Such storing operation may be induced by displaying an expression, such as 'saving in progress,' on the display 151.

As shown in FIG. 6C, the optical sensor 145 for inputting the second command may be replaced with another optical sensor (e.g., 146) according to a user's manipulation. The change in the optical sensor, as described above in relation to FIG. 5C, may be implemented by the dragging operation toward another desired optical sensor (e.g., 146) when the optical sensor (e.g., 145) is being approached.

During the approaching to the optical sensor 145 for the dragging operation, in order to prevent some of the optical sensors 145a to 145c from receiving the input of the second command, the mobile terminal 100 may be configured so that the change in the optical sensor is done when the dragging operation is carried out with at least two fingers approaching the optical sensors 145a to 145c.

Figure 7:
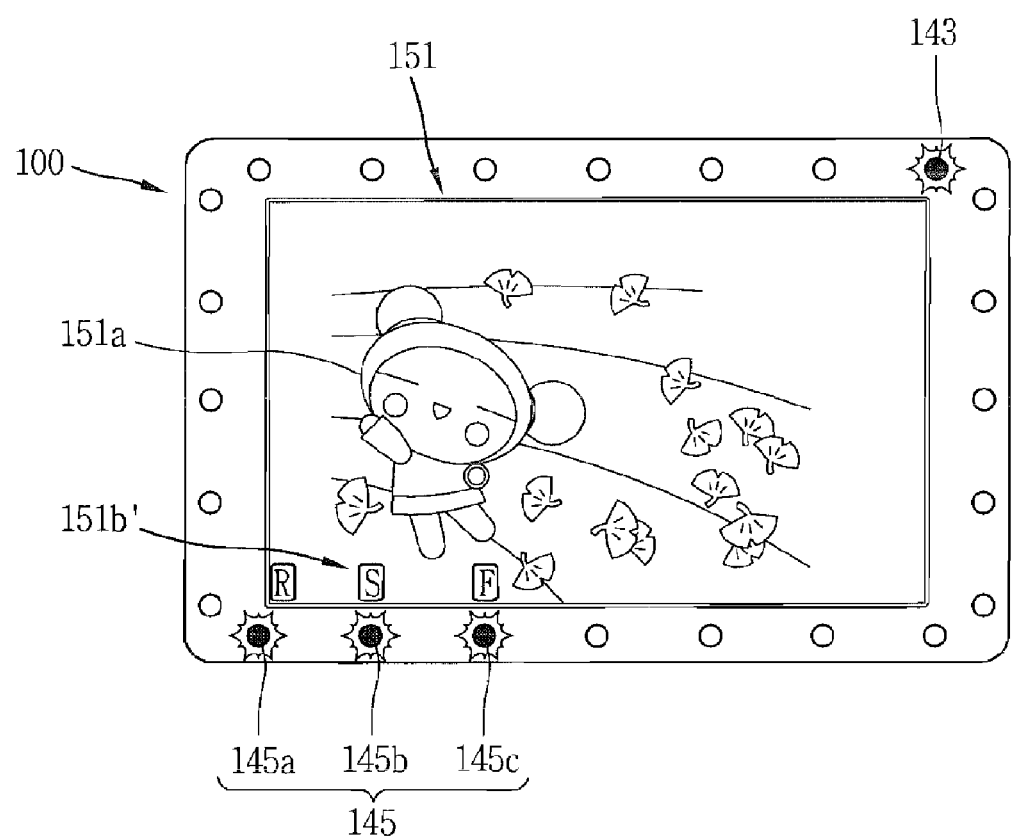
FIG. 7 is an overview of the second visible information of FIG. 6A in a different display form.

FIG. 7 is an overview showing the second visible information (151b) of FIG. 6A is in a different display form. As shown in FIG. 7, the second visible information 151b (see FIG. 6A) displayed by the input of the first command via the second optical sensor 143 may be output in a different display form after the elapse of a preset time or responsive to a user's setting. For example, the second visible information 151b may be displayed briefly with initials representing each menu content item. For example, if the second visible information 151b includes 'rewind,' 'save,' and 'forward,' the second visible information 151b' in the different display form may include the initials, i.e., 'R,' 'S' and 'F.' Alternatively, images or icons indicating the rewind or the like may be displayed as the second visible information 151b' in the different display form. In the meantime, the contents of the second visible information 151b may not be understood by the initials or icons. In this case, the second optical sensor 143 may be approached in order to display the full second visible information 151b again.

Figure 8:
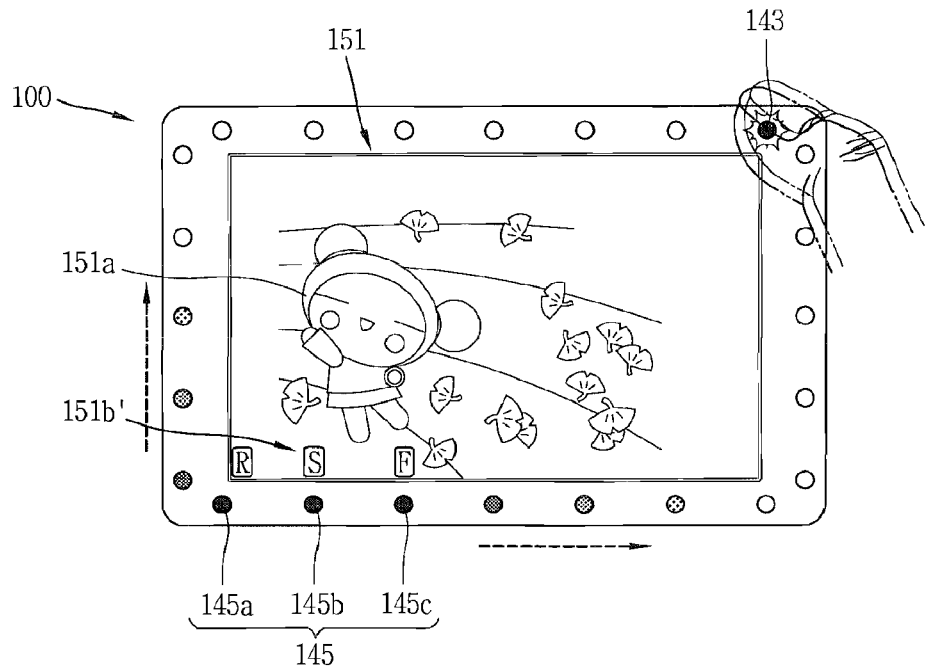
FIG. 8 is an overview showing that the displayed state of the second visible information in the different display form is released.

FIG. 8 is an overview showing that the displayed state of the changed second visible information 151b' is released. As shown in FIG. 8, to display only guide information 151a' in the state of the second visible information 151b' in the different display form being displayed, or to return to the state of only the first visible information 151a being displayed, the second optical sensor 143 may be approached repeatedly.

When a user double approaches the second optical sensor 143, the portable terminal 100 recognizes the double approach as a command corresponding to a type of double-clicking. In response to this recognition, the second visible information 151b' in the different display form may cease to be displayed or both the second visible information 151b' in the different display form and the guide information 151a' may all cease to be displayed. In this case, the fourth optical sensor 145 and/or the second optical sensor 143 are deactivated and the peripheral optical sensors of the fourth optical sensor 145 may sequentially emit light for alarming. The light emission may be carried out in opposite directions away from the fourth optical sensor 145. Such light emission for alarming may visually represent that visible information displayed on the display 151 is moved to its upper level and activated optical sensors are deactivated.

Alternatively, the second optical sensor 143, and other optical sensors 144, 146, 147 and 148, may be deactivated such that the second optical sensor 143 cannot be manipulated and the fourth optical sensor 145 can receive the second command. Accordingly, any command can be prevented from being unintentionally input into the second optical sensor 143. However, the second optical sensor 143 may be configured to be optionally operable in order to return to the previous level, as aforementioned. Such configuration may be implemented in a manner of controlling the second optical sensor 143 to be re-activated when any input for the fourth optical sensor 145 is not given for a particular time period.

Figure 9A:
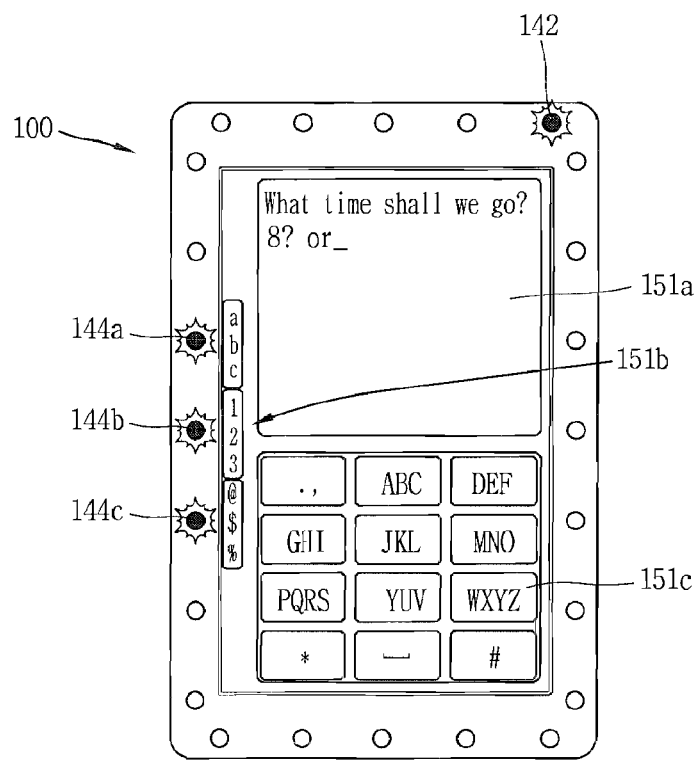
FIGS. 9A to 9C are overviews of inputting a different type of information, which is input while writing a text message using the portable terminal.
Figure 9B:
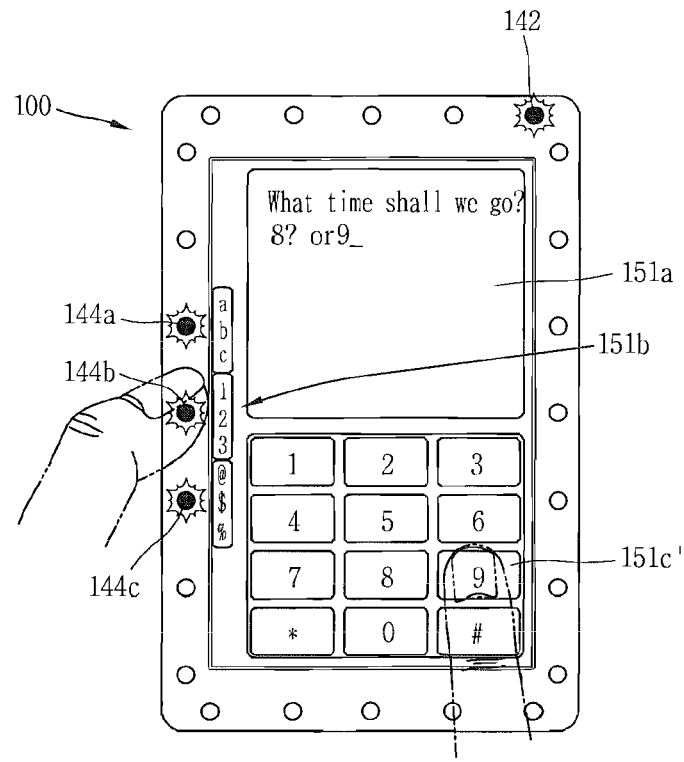
Figure 9C:
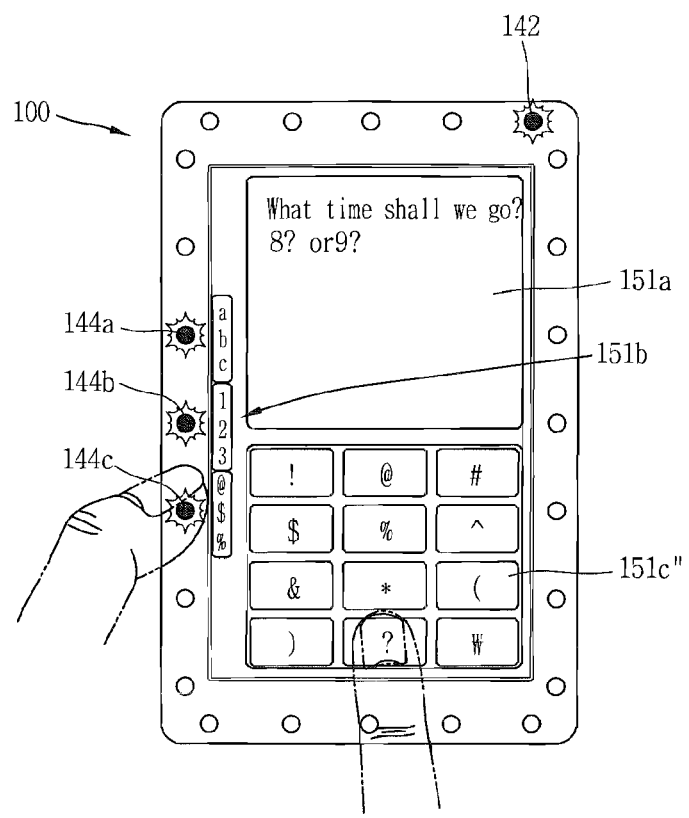

FIGS. 9A to 9C are overviews for inputting a different type of information from the earlier-described type of information, which is input while writing a text message using the portable terminal 100. As shown in FIG. 9A, words may be input by using soft keys displayed on the display 151. For the input of words, several soft keys 151c for inputting letters may be displayed at a lower portion of the display 151.

When it is desirable to input numbers during the input of words, a user approaches the first optical sensor 142. When the first command is input responsive to the approach, menus for displaying numbers are displayed as the second visible information 151b on the left side of the display 151. Optical sensors 144a to 144c of the third optical sensor 144 that correspond to the visible information 151b are activated and visible light is output from their associated positions.

As shown in FIG. 9B, when a user approaches the optical sensor 144b corresponding to a numeral related menu for inputting numbers, soft keys 151c' for inputting numbers as third visible information are output on the display 151. The user can touch the soft keys 151c' with a finger of his right hand by continuously approaching or contacting the optical sensor 144b with a finger of his left hand.

When a desired number (e.g., "9") is input by touching the region with the corresponding soft key 151c' of the display 151, the number (e.g., "9") is displayed on an output window at the upper portion of the display 151. Accordingly, the contents of the first visible information 151a are edited. After the edit of the first visible information 151a, if the user moves his left finger away from the optical sensor 144b, the soft keys 151c' for inputting the numbers cease being displayed.

As shown in FIG. 9C, for inputting symbols, the user may approach the optical sensor 144c which allows such input. When a second command is input responsive to the approach, soft keys 151c" for inputting the symbols are output on the lower portion of the display 151. When the user touches one of the soft keys 151c" indicating a symbol (e.g., "?"), the symbol (e.g., "?") may be displayed on the output window of the display 151.

Figure 10A:
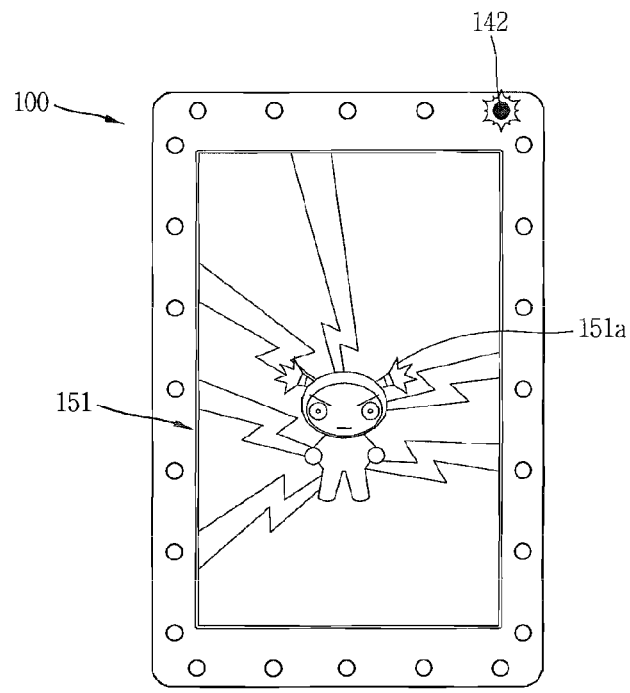
FIGS. 10A to 10C are overviews showing a situation of viewing contents of a text message using the portable terminal.
Figure 10B:
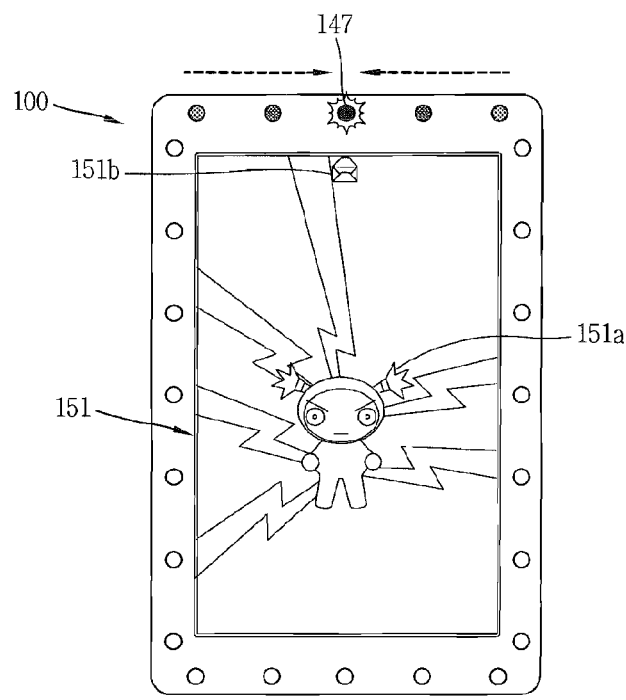
Figure 10C:
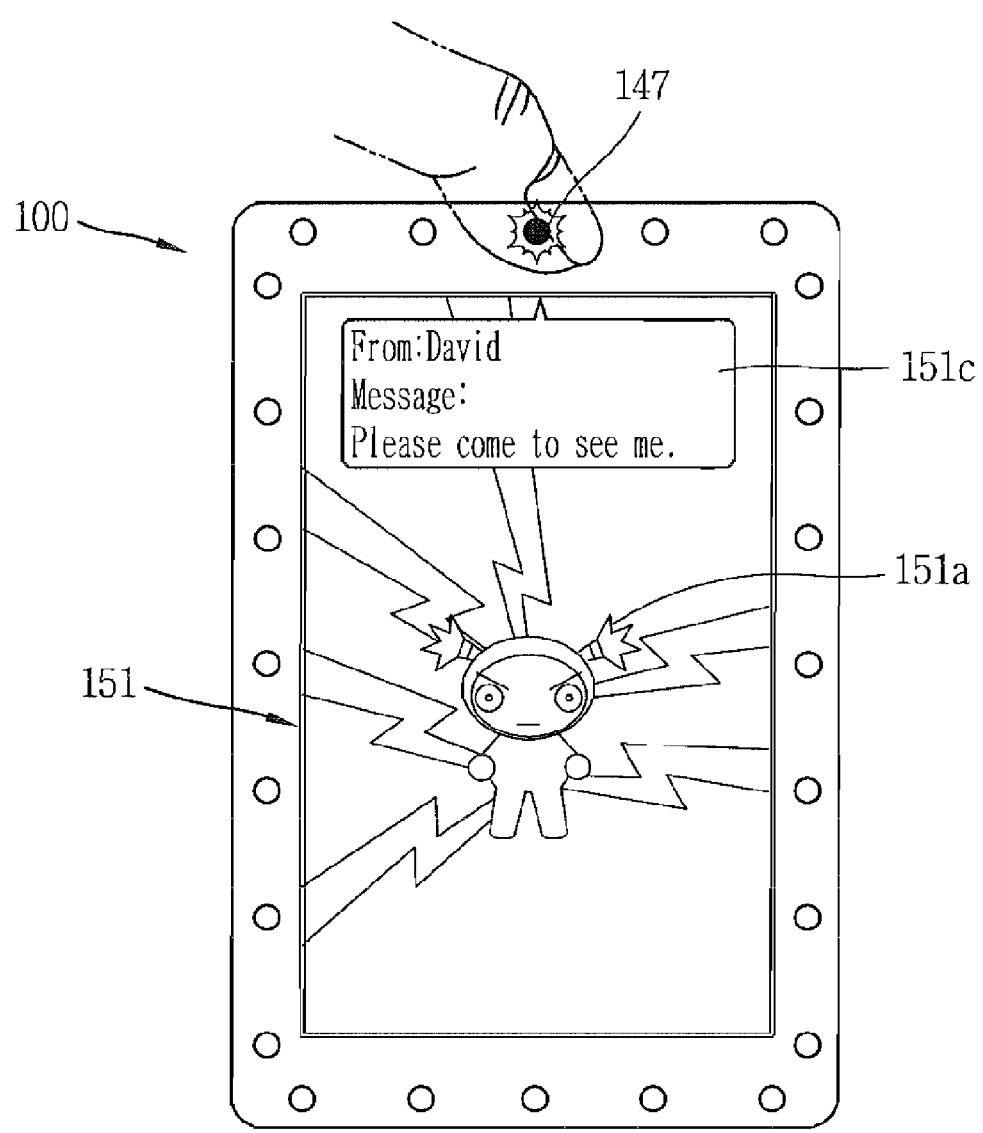

FIGS. 10A to 10C are overviews showing the viewing of contents of a text message using the portable terminal 100. As shown in FIG. 10A, upon receiving a text message, the first optical sensor 142 may be activated and visible light may be output accordingly.

As shown in FIG. 10B, when a user approaches the first optical sensor 142 to input a first command, the sixth optical sensor 147 is activated. Accordingly, an icon for indicating a text message as the second visible information 151b is output on the display 151.

As shown in FIG. 10C, when the user approaches the sixth optical sensor 147, contents of the text message as the third visible information 151c are displayed on the display 151. When the user ceases to approach the sixth optical sensor 147, the contents of the text message ceases to be displayed on the display 151.

Figure 11:
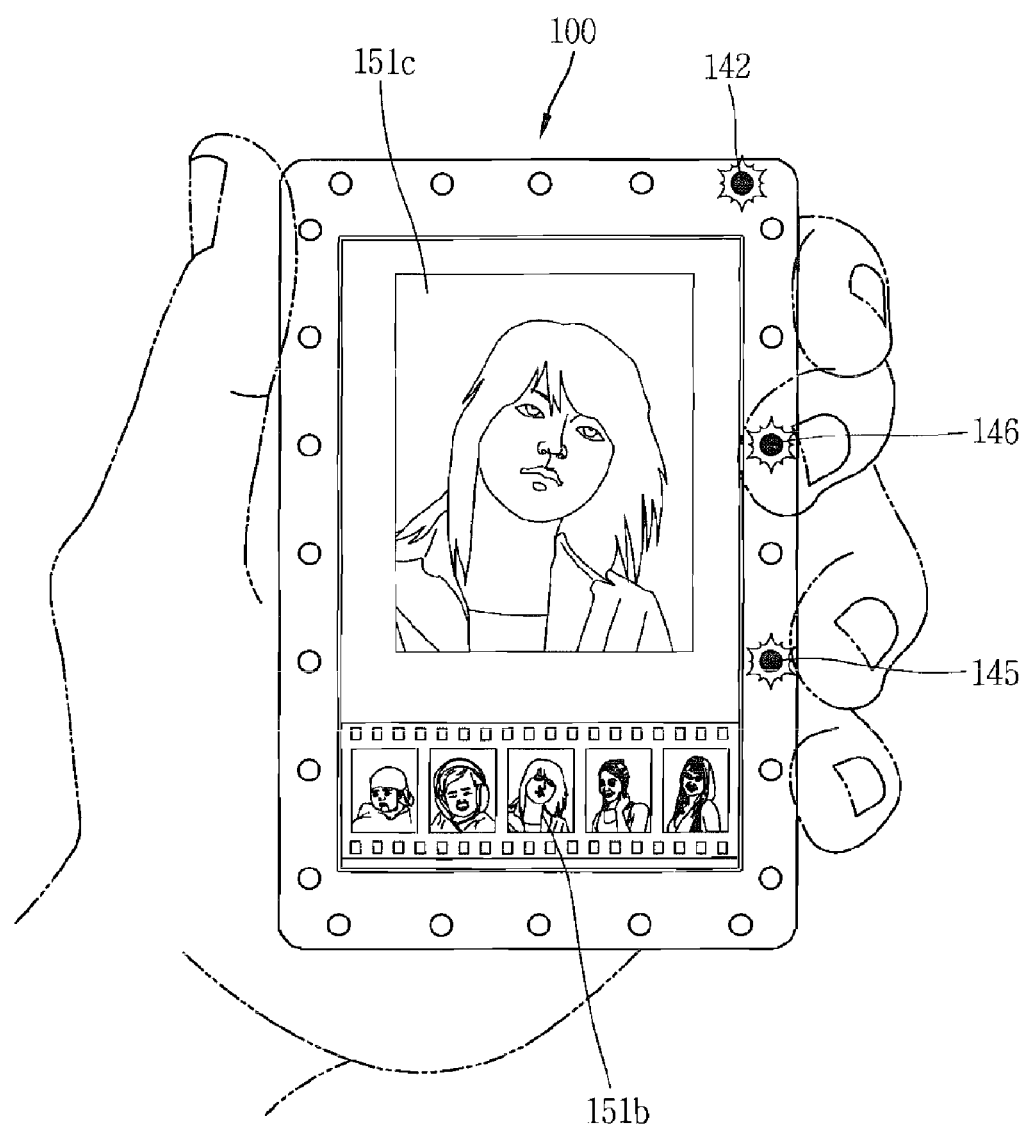
FIG. 11 is an overview showing the viewing of an image using the portable terminal.

FIG. 11 is an overview depicting the viewing of an image using the portable terminal 100. As shown in FIG. 11, when a first command is input into the first optical sensor 142, image files may be displayed as the second visible information 151b. If a user approaches the fourth optical sensor 145 using the fourth finger of his left hand grasping the portable terminal 100 in the drawing, the plurality of image files are scrolled. The scrolling may be stopped when the finger approaching the fourth optical sensor 145 is moved away or is getting away from the fourth optical sensor 145.

When the scrolling is ceased, if the user's second finger approaches the fifth optical sensor 146, a preview screen for an image file 151c on which a cursor is currently located may be displayed on the display 151 as the third visible information 151c.

The fourth and fifth optical sensors 145 and 146 may be manipulated for the scroll and preview by using second and fourth fingers when the user grasps the portable terminal 100 with his left hand. Accordingly, the manipulation can be carried out quickly and easily.

The aforementioned methods according to each embodiment of the present invention may be implemented in a medium having a program recorded as computer-readable codes. Examples of such computer-readable media may include ROM, RAM, CD-ROM, magnetic tape, floppy disk, optical data storage element, and the like. Also, such computer-readable medium may be implemented in a type of a carrier wave (e.g., a transmission via the Internet).

In a portable terminal and a method for controlling the output thereof according to at least one embodiment of the present invention having such configuration, visible light is allowed to be emitted from a plurality of positions corresponding to sensors capable of receiving a command associated with visible information output on a display, whereby a user can recognize operable sensors and carry out the corresponding operations.

The foregoing embodiments and advantages are merely exemplary and are not to be construed as limiting the portable terminal and the method for controlling the output thereof described in the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds, are therefore intended to be embraced by the appended claims.

What is claimed is:

1. A method for controlling a mobile terminal, the method comprising:
outputting first visible information on a display, the display associated with the mobile terminal;
outputting visible light proximate to a first sensor of a plurality of sensors, the plurality of sensors coupled to the mobile terminal and located at a peripheral region surrounding the display, the first sensor configured to control a function associated with the first visible information; and
outputting second visible information on the display, the second visible information being responsive to an input received by the first sensor.

2. The method of claim 1, wherein each of the plurality of sensors comprises an optical sensor configured to output visible light and to detect a change in the output visible light.

3. The method of claim 2, wherein each optical sensor comprises a light emitting element located within each optical sensor.

4. The method of claim 2, further comprising:
sequentially sensing movement of an object by the optical sensors, wherein each optical sensor is configured to detect at least a distance between the optical sensor and the object causing the change in the visible light, a period of time during which the object approaches the optical sensor, whether the object no longer approaches the optical sensor, a direction in which the approaching object is released, a quantity of re-approaches by the object after its release, or a direction of movement of the object.

5. The method of claim 1, further comprising:
ceasing output of the visible light proximate to the first sensor after a preset duration of time elapses.

6. The method of claim 1, wherein the display of the second visible information at least partially overlaps the display of the first visible information.

7. The method of claim 1, wherein a form of the second visible information is changeable.

8. The method of claim 1, wherein the second visible information includes information that causes a change to the first visible information.

9. The method of claim 1, wherein:
a second sensor of the plurality of sensors is configured to control a function associated with the second visible information; and
the first sensor is different from the second sensor.

10. The method of claim 9, further comprising:
deactivating remaining sensors of the plurality of sensors so as to not permit the remaining sensors to receive an input when the first or second sensor is activated to permit receiving an input.

11. The method of claim 10, further comprising:
generating an alarm light from a light emitting element of each remaining sensor regardless of whether an input is received by the first or second sensor.

12. The method of claim 11, wherein generating the alarm light is intermittently performed by all of the remaining sensors simultaneously or by each of the remaining sensors sequentially.

13. The method of claim 1, further comprising:
switching the control of the function associated with the first visible information from the first sensor to a third sensor of the plurality of sensors such that the third sensor controls the function associated with the first visible information.

14. The method of claim 13, wherein the switching occurs when there is a change in an orientation of the display.

15. The method of claim 1, wherein the display comprises a touch screen configured to receive a touch input, the touch input configured for permitting at least the control of the function associated with the first visible information.

16. A portable terminal comprising:
a main body comprising a wireless communication unit;
a display coupled to the main body and configured to output first visible information and second visible information, the second visible information being responsive to a user input;
a plurality of sensors coupled to the main body and located at a peripheral region surrounding the display, wherein at least one sensor of the plurality of sensors is configured to receive a user input for controlling a function associated with the first visible information; and
a plurality of light elements configured to output visible light, each of the light elements associated with one of the plurality of sensors, the light elements configured to output the visible light proximate to an associated sensor, wherein the at least one sensor is configured to control the function associated with the first visible information.

17. The terminal of claim 16, wherein:
each of the plurality of sensors comprises an optical sensor;
each optical sensor is configured to output visible light and to detect a change in the visible light; and
each optical sensor comprises one of the plurality of light elements.

18. The terminal of claim 16, wherein:
each of the plurality of sensors comprises an optical sensor; and
each optical sensor is configured to output non-visible light and detect a change in the non-visible light.

19. The terminal of claim 16, wherein:
the display occupies a central region of a surface of the main body; and
the plurality of sensors are located at a peripheral region surrounding the display.

* * * * *